United States Patent [19]
Hattori et al.

[11] 3,859,541
[45] Jan. 7, 1975

[54] ELECTRIC CONTROL SYSTEM FOR AUTOMOBILE EXHAUST EMISSION CONTROL SYSTEMS

[75] Inventors: Tadashi Hattori, Nishio; Hisato Wakamatsu, Toyota; Takamichi Nakase, Gamagori; Shuzo Yoshida, Okazaki, all of Japan

[73] Assignee: Nippon Soken, Inc., Aichi-ken, Japan

[22] Filed: Dec. 19, 1973

[21] Appl. No.: 426,199

[30] Foreign Application Priority Data
Dec. 26, 1972 Japan.................................. 47-3086

[52] U.S. Cl. .......... 307/10 R, 180/105 E, 123/97 R
[51] Int. Cl............................................ B60k 13/00
[58] Field of Search....... 307/10 R, 120; 180/105 E, 180/106; 340/263; 123/97 B, 97 R, 102, 117, 119

[56] References Cited
UNITED STATES PATENTS
3,581,839   6/1971   Carp.................. 180/105 E Primary Examiner—Herman J. Hohauser
Attorney, Agent, or Firm—Cushman, Darby & Cushman

[57] ABSTRACT

There is provided an electric control system comprising a computing section integrally built into a MOS large scale integrated circuit (comprising a timing signal generating circuit, a speed signal generating circuit, a vehicle speed discriminating circuit, a control program circuit, etc.) which, in accordance with the digital signals from various sensors for detecting the operating conditions of an engine, generates solenoid signals for selectively controlling solenoid valves which effect exhaust emission control actions, and a power circuit for selectively actuating the solenoid valves in accordance with the solenoid signals from the computing section.

6 Claims, 11 Drawing Figures

F I G. I

ELECTRIC CONTROL SYSTEM FOR AUTOMOBILE EXHAUST EMISSION CONTROL SYSTEMS

BACKGROUND OF THE INVENTION

1. Field of the Invention

This invention relates to improvements of an electric control system for automobile exhaust emission control systems.

2. Description of the Prior Art

Known control systems of this type are mainly of the analog type in which a control circuit is formed on a printed board by using individual component parts such as transistors and diodes, whereby all the signals from various sensors are converted into DC voltages and are discriminated as such to perform the required operations. For this reason, the assembling of such conventional control system necessarily involves circuit adjusting operations and thus there is a drawback in that the time required for such circuit adjustments increases in proportion to the complexity of the control functions and this results in an increase in the manufacturing costs. Although the use of digital circuits are useful for eliminating such circuit adjusting operations, there is a disadvantage in that if a control system is constructed with commercially available digital integrated circuits (hereinafter referred to as digital IC), the control system becomes extremely bulky and thus it becomes disadvantageous from practical point of view.

With a view to overcoming the foregoing difficulty, it is an object of the present invention to provide an electric control system for automobile exhaust emission control systems comprising a computing section for performing predetermined computational operations on various input signals for setting control conditions for automobile exhaust emission control systems and generating solenoid signals for selectively controlling solenoid valves adapted to control the operation of the exhaust emission control systems, and a power stage for selectively actuating the solenoid valves in accordance with the solenoid signals from the computing section, wherein the computing section is composed of a MOS large scale IC, whereby to ensure reduced power consumption, simplified circuit construction and rationalized wiring designing.

The system according to the present invention has among its remarkable advantages the fact that as compared with conventional electric control systems for exhaust emission controls requiring extremely complicate controls in which the control circuitry is composed of individual component parts, the power consumption required for the necessary computational operations is reduced considerably, the circuit construction is made simple and compact and the wiring designing is rationalized to properly operate the exhaust emission control systems, and moreover uniformity of the control accuracy and extended life of the electric control system can be accomplished easily with resultant decrease in the mass production costs of the electric control system.

Another remarkable advantage is the use of a piezoelectric oscillator element as a timing signal generating oscillator circuit with the result that its higher accuracy than that required for the control circuit permits the elimination of the circuit checking during the manufacturing process of the control circuit.

Still another remarkable advantage is the provision of versatility that satisfies the necessary conditions when different control systems for exhaust emission control systems are used for different engines.

Still another remarkable advantage is the fact that should any emergency such as a fault occur in the exhaust emission control system, the system is controlled to operate on the safe side, e.g., it quickly comes out of operation.

Still another remarkable advantage is the prevention of erroneous operation of the solenoid valves due to the disconnection or grounding of the connection points between the computing section and the power stage.

DESCRIPTION OF THE PREFERRED EMBODIMENT

The present invention will now be described in greater detail with reference to the illustrated embodiment.

Figure 1:
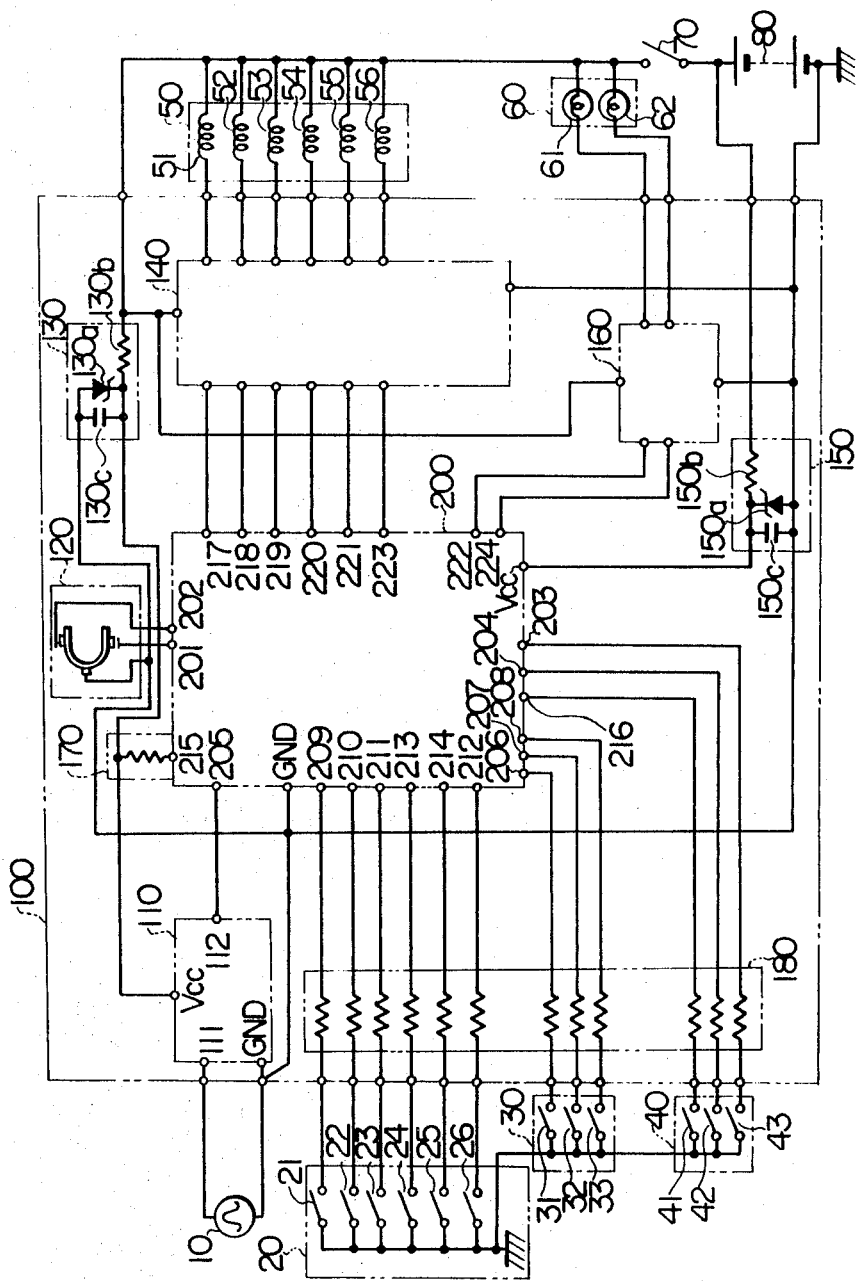
FIG. 1 is a block diagram showing an embodiment of an electric control system for automobile exhaust emission control systems according to the present invention.

Referring first to FIG. 1 showing a block diagram of an electric control system for automobile exhaust emission control systems, numeral 100 designates a control circuit to which are connected the following peripheral devices. Namely, numeral 10 designates an electromagnetic generator responsive to the wheel rotation to generate AC voltage. Numeral 20 designates sensor unit for detecting various operating conditions of an engine in which numeral 21 designates an Oil temperature sensor, numerals 22 and 23 cooling water temperature sensors, numerals 24 and 25 catalytic converter temperature sensors, numeral 26 a manifold reactor temperature sensor. Numeral 30 designates a system selector switch unit in which numeral 31 designates an A-system switch, numeral 32 a B-system switch, numeral 33 a C-system switch. The system A comprises, in combination, such exhaust emission control systems as a manifold reactor in which secondary air is supplied into a container mounted in the exhaust manifold and holding the exhaust gases therein to cause the exhaust gases to burn themselves with the heat thereof, catalytic converter provided respectively with a reducing catalyst and an oxidizing catalyst, an exhaust gas recycling (EGR) system which recirculates a portion of the exhaust gases to the intake system, and an ignition advance cutout system for retarding the ignition timing.

The system B is identical with the system A excepting that the manifold reactor is replaced with a throttle positioner which holds the throttle valve in a slightly open position during the deceleration periods, and the system C is identical with the system A excepting that the throttle positioner is included in place of the manifold reactor and the reducing catalyst converter. With these systems, control conditions for the same controlled system differ with the different systems and therefore the A-system switch 31 alone is maintained at a high level (open) and the B-system switch 32 and the C-system switch 33 are maintained at a low level (ground) when the system A is to be utilzed. The other systems B and C may also be selected in the similar manner.

In the following description, the high level is treated as 1 level and the low level is treated as 0 level. Numeral 40 designates a conditional switch unit, numeral 41 an emergency command switch whose 1 level (open) indicates the normal condition and 0 level (ground) indicates an emergency command. Numeral 42 designates a time reduction indicating switch whose 1 level indicates the reduction of time and 0 level indicates the normal condition. Numeral 43 designates an alarm selection switch whose 1 level indicates the selection of a lamp and 0 level indicates the selection of a buzzer. Numeral 50 designates output solenoid valves and numerals 51, 52, 53, 54, 55 and 56 designate solenoid coils. Numeral 60 designates an alarm, numerals 61 and 62 lamps, numeral 70 a key switch, numeral 80 a power supply such as an automobile battery.

Figure 2:
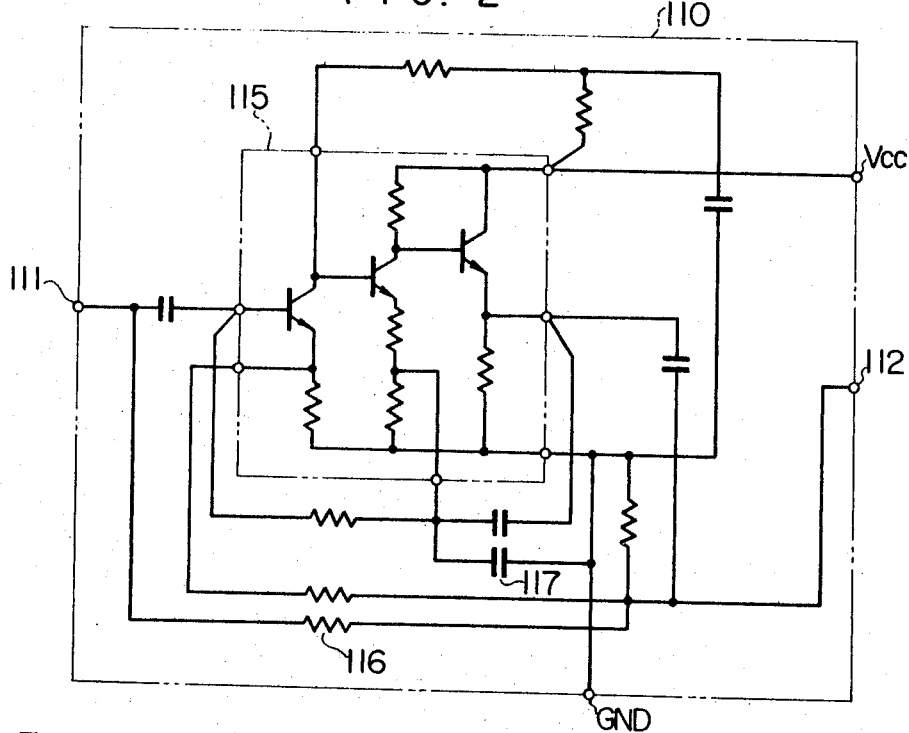
FIG. 2 is a wiring diagram showing an embodiment of an amplifier and converter circuit used in the embodiment of FIG. 1.

Next, the detailed circuit construction of the control circuit 100 will be described, in which numeral 100 designates an amplifier and converter circuit whereby the AC output voltage of the generator 10 responsive to the rotation of the vehicle axle shaft is converted to a squarewave voltage and its detailed circuit construction is shown in FIG. 2. This circuit 110 is designed so that when the AC output voltage from the generator 10 terminates with the vehicle at rest, it starts its blocking oscillating action to generate a converted output squarewave voltage and thereby to prevent the deterioration of the signal-to-noise ratio of the input signal level to the noise level and its oscillation frequency is 30.72 Hz per 1 mile/h of the vehicle speed in the present embodiment. In this case, since the range of the vehicle speeds under control is between 5 and 100 mile/h, the blocking oscillation frequency is on the order of 30 Hz. In FIG. 2, numeral 111 designates an input terminal, numeral 112 an output terminal, $V_{cc}$ a power supply terminal, GND a ground terminal, numeral 115 a linear IC which is for example TA7063P manufactured by Tokyo Shibaura Denki K.K. and which sets the blocking oscillation frequency in accordance with the values of a resistor 116 and a capacitor 117. Numeral 120 designates a piezoelectric type oscillator element which is for example a Pilefork 2,048 Hz manufactured, by K.K Murata Seisakusho and which serves as a time standard for the entire control system. This oscillator element 120 oscillates in association with a field effect transistor (hereinafter referred to as an FET) which is one of the component elements integrally built into a computing section 200 composed of a MOS large scale integrated circuit (hereinafter referred to as an LSI) which will be described later.

Numerals 130 and 150 designate the simplest voltage regulator circuits of the known type which comprise respectively a Zener diode 130a, a resistor 130b and a capacitor 130c and a Zener diode 150a, a resistor 150b and a capacitor 150c. The voltage regulator circuit 150 supplies the computing section 200 and the voltage regulator circuit 130 supplies the amplifier and converter circuit 110. Numeral 170 designates a resistor for supplying the regulated power supply voltage from the voltage regulator circuit 130 as the signal from a key switch 70 which is applied as an input signal to the computing section 200.

Figure 3:
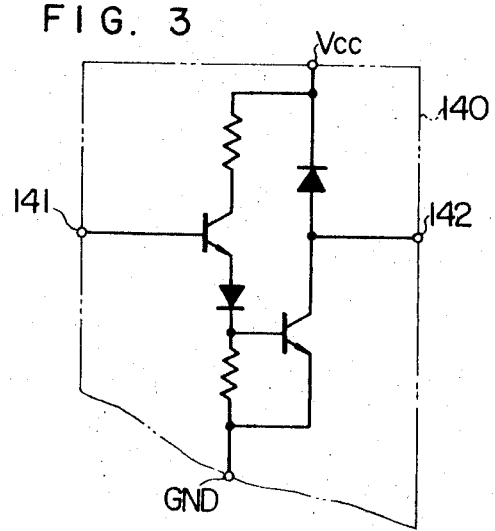
FIGS. 3 and 4 are wiring diagrams showing the two power stages used in the embodiment of FIG. 1.

Numeral 140 designates a two-stage amplification type transistor power stage of the known circuit construction as shown in detail in FIG. 3 wherein numeral 141 designates an input terminal, 142 an output terminal, $V_{cc}$ a power supply terminal, GND a ground terminal, whereby when a high level input signal is applied to the input terminal 141, an actuating output signal is generated at the output terminal 142. FIG. 3 shows only one of six of the substages and the other five substages are of the same construction.

Figure 4:
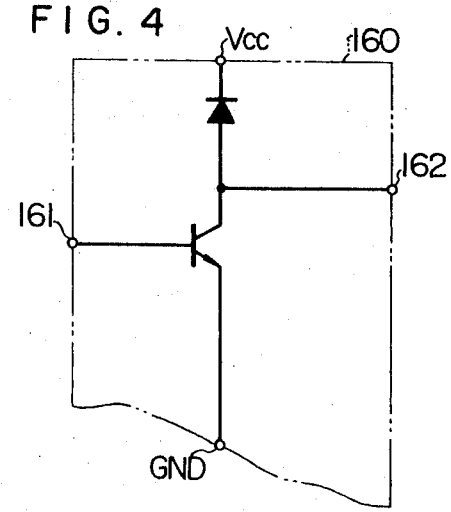

Numeral 160 designates a single-stage transistor power stage for actuating an alarm 60 and its detailed circuit construction is shown in FIG. 4. In FIG. 4, numeral 161 designates an input terminal, numeral 162 an output terminal, $V_{cc}$ a power supply terminal, GND a ground terminal thus constituting a circuit of the known type in which the application of a high level input signal to the input terminal 161 results in the generation of an actuating output signal at the output terminal 162. FIG. 4 shows one of two of the substages and the other substage is of the same construction. Resistors 180 provided in series in the respective signal lines interconnecting the sensor unit 20, the selector switch unit 30 and the conditional switch unit 40 to the LSI computing section 200 serve to protect the LSI computing section 200 from the external field.

Figure 5:
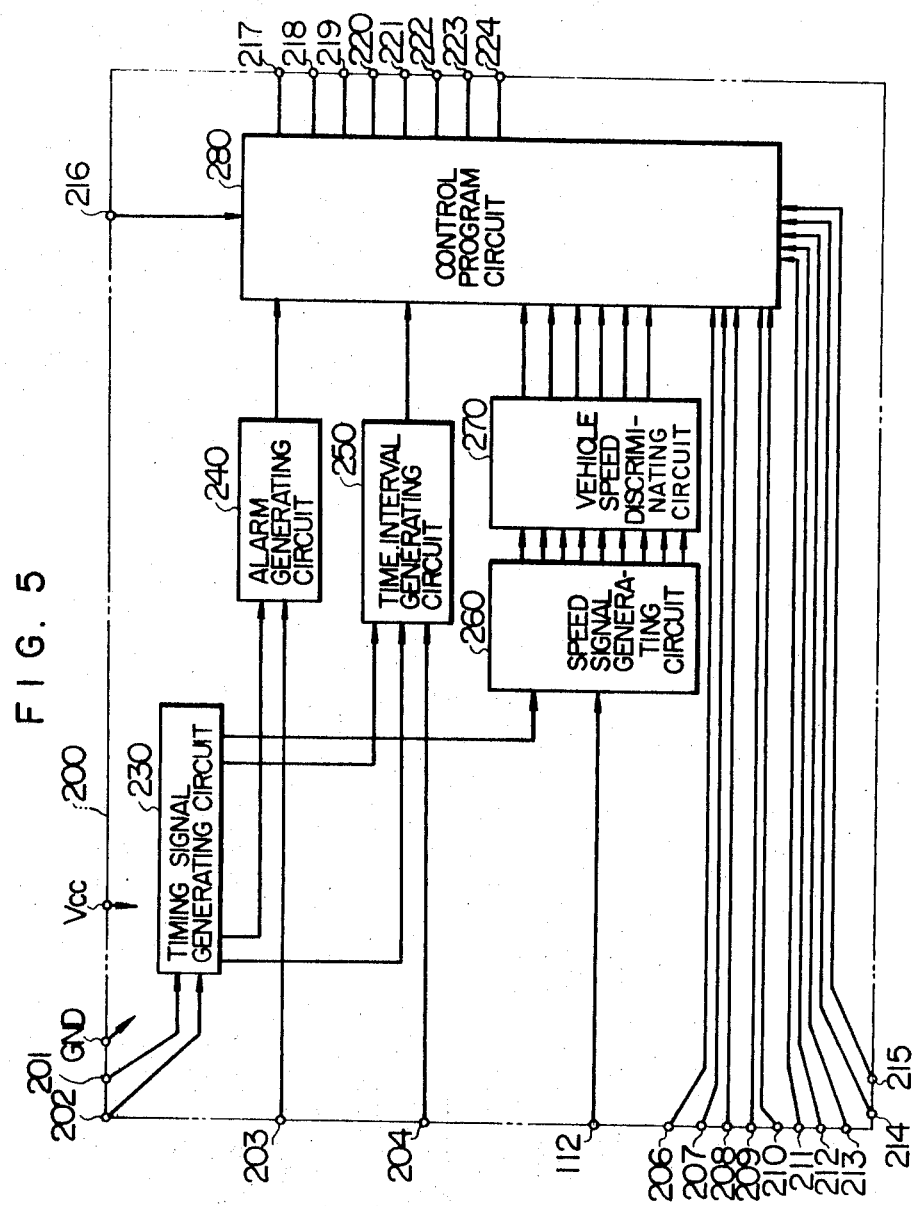
FIG. 5 is a detailed block diagram of the computing section used in the embodiment of FIG. 1.
Figure 6:
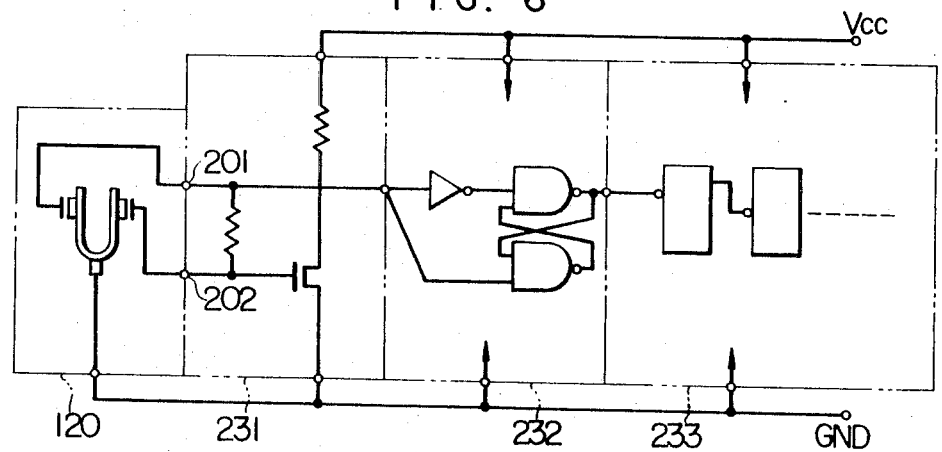
FIG. 6 is a wiring diagram showing the timing signal generating circuit in the block diagram of FIG. 5.

The computing section 200 performs the necessary computational operations on the previously mentioned input signals to supply actuating output signals to the power stages 140 and 160, and it comprises digital circuits which are fabricated on a single chip to form a MOS LSI. FIG. 5 is a block diagram showing the construction of the computing section 200. In FIG. 5, numerals 201 and 202 designate oscillation terminals connected to the oscillator element 120, GND a ground terminal, numeral 203 an alarm selection terminal connected to the alarm selection switch 43, numeral 204 a time reduction terminal connected to the time reduction indication switch 42, numeral 112 a speed signal terminal connected to the output terminal 112 of the amplifier and converter circuit 110, numerals 206, 207 and 208 system selection terminals connected respectively to the switches 31, 32 and 33 in the selector switch unit 30. Numerals 209, 210, 211, 212, 123, 214 and 215 designate sensing input terminals respectively connected to the sensors 21, 22, 23, 24, 25, and 26 in the sensor unit 20 for detecting the operating conditions of the engine and the resistor 170 for supplying the output signal of the key switch 70, numeral 216 an emergency terminal connected to the emergency command switch 41, numerals 217, 218, 219, 220, 221, 223 and 224 output terminals. While the power supply terminal $V_{cc}$ and the ground terminal GND are connected to the respective blocks, these connections are not shown. Numeral 230 designates a timing signal generating circuit for performing a timing signal generating function along with the oscillator element 120 connected to the terminals 201 and 202 and its detailed circuit construction is shown in FIG. 6. In FIG. 6, numeral 231 designates an FET oscillator circuit whose oscillation frequency is determined by the oscillator element 120 and this oscillation frequency is set to 2,048 Hz in this embodiment. The oscillation output is converted into a squareware by a reshaping circuit 232 and it is then applied to a frequency dividing circuit 233 which in turn generates timing signals of down to 2 Hz.

Numeral 240 designates an alarm generating circuit. In this embodiment, this circuit performs the NAND operation on the 1,024 Hz signal and the alarm selection input signal from the terminal 203 to select the 1 level or the oscillation output from the timing signal generating circuit 230 thus producing a signal for actuating the alarm 60 to give an alarm.

Numeral 250 designates a time interval generating circuit which effects the reduction of time to 1/512 when a 1 level signal is applied to the terminal 204 and performs no time reduction when a 0 level signal is applied to the terminal 204, and in this embodiment it comprises a gating circuit of the known type which performs the logical operation on the 4 Hz signal, the 2,048 Hz signal and the input signal from the terminal 204.

Numeral 260 designates a speed signal generating circuit wherein in accordance with the output signal of the timing signal generating circuit 230 and the vehicle speed signal from the terminal 112, 23 shift register stages are shifted for every 32 cycles of the vehicle speed signals at intervals of 4 mile/h of the vehicle speed. In this case, the clearing operation of the shift register is effected during several microseconds immediately following the change from the 1 to 0 level of the 2 Hz timing signal from the timing signal generator 230 and this causes the output signal of all the register stages to change to the 1 level. Then, in accordance with number of cycles of the speed signals received during the time when the 2 Hz timing signal is at the 1 level, i.e., during 0.25 seconds, the stable conditions of the register stages are successively changed. For instance, if the vehicle speed signal arrives at the 96th cycle, only three of the register stages change their states.

Figure 7:
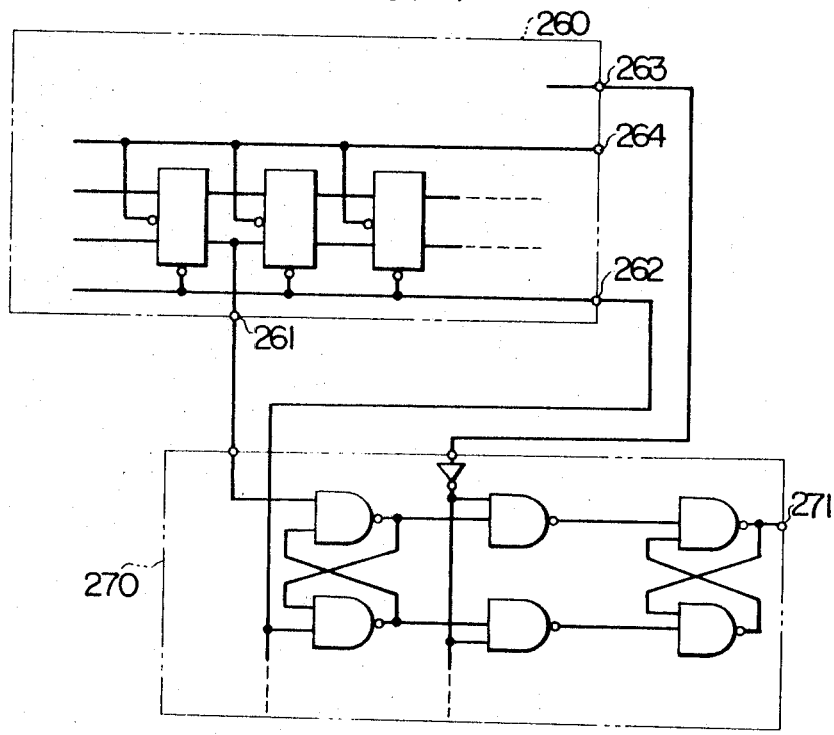
FIG. 7 is a wiring diagram showing the speed signal generating circuit and the vehicle speed discriminating circuit in the block diagram of FIG. 5.
Figure 8:
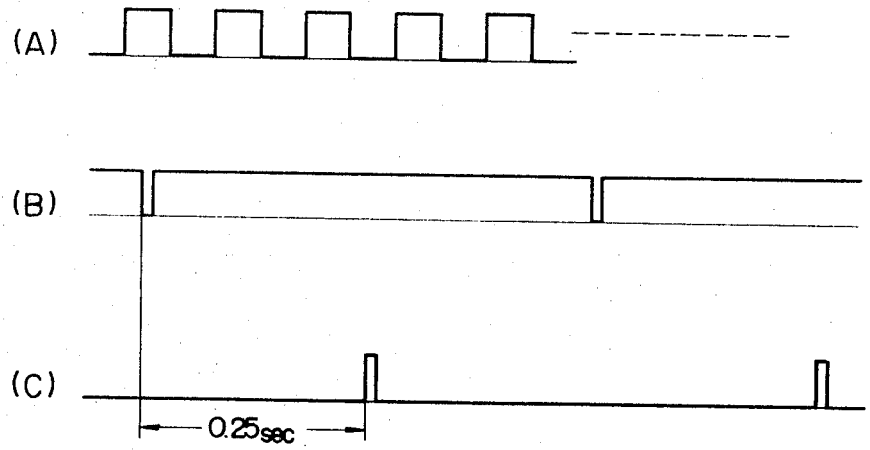
FIG. 8 is a waveform diagram useful for explaining the operation of the circuits shown in FIG. 7.

Numeral 270 designates a vehicle speed discriminating circuit which generates a discrimination signal in accordance with the speed signal from the speed signal generating circuit 260. The connections between the vehicle speed discriminating circuit 270 and the speed signal generator 260 are shown in FIG. 7. In FIG. 7, there is illustrated only one of six of the subcircuits and the other five subcircuits are identical in construction. In FIG. 7, numerals 261, 262 and 263 designate respectively a speed signal terminal, a clear pulse terminal and a strove signal terminal connected to the speed signal generating circuit 260, numeral 264 a shift pulse terminal for receiving shift pulses, numeral 271 a terminal at which the vehicle speed signal of this subcircuit of the vehicle speed discriminating circuit 270 is generated. When the vehicle speed reaches a predetermined value for this subcircuit, the vehicle speed is discriminated in accordance with the speed signals from the terminals 261, 262 and 263 to generate the corresponding discrimination signal. This operation will be described with reference to the waveform diagram of FIG. 8. In the waveform diagram of FIG. 8, FIG. 8(A) shows the speed signal at the speed signal terminal 261, FIG. 8(B) shows the clear pulse at the clear pulse terminal 262 and FIG. 8(C) shows the strove signal at the strove signal terminal 263. When the speed signal shown in FIG. 8(A) is generated at the terminal 261, it is applied to the vehicle speed discriminating circuit 270. At this time, if the clear pulse shown in FIG. 8(B) is generated at the terminal 262, the counter in the speed signal generating circuit 260 and the vehicle speed signal discrimnating circuit 270 are all cleared. In this case, the terminal 271 for generating the discrimination signal of the vehicle speed discriminating circuit 270 maintains its previous state so that in accordance with the strove signal of FIG. 8(C) generated after the expiration of 0.25 seconds at the intermediate point between the two clear pulses shown in FIG. 8(B), it is determined whether the vehicle speed has reached a predetermined value and the discrimination signal at the terminal 271 goes to the 1 level when the vehicle speed has reached the predetermined value. In this case, if a plurality of this type of subcircuits are used to discriminate the corresponding number of predetermined values, e.g., if the vehicle speeds of 38 mile/h and 42 mile/h are detected to generate the corresponding discrimination signals, the discrimination signal at the terminal for discriminating the vehicle speed of 32 mile/h always goes to the 1 level when the discrimination signal at the terminal for discriminating the vehicle speed of 42 mile/h is at the 1 level. In other words, if any discrimination signal goes to the 1 level, all of the discrimination signals at the terminals for discriminating vehicle speeds lower than the discriminated vehicle speed also go to the 1 level. The provision of this function is very effective in checking this circuit.

Numeral 280 designates a control program circuit which receives as its inputs and performs the logical operation on the signals from the alarm generating circuit 240, the time interval generating circuit 250, the vehicle speed discriminating circuit 270 and the terminals 206, 207, 208, 209, 210, 211, 212, 213, 214, 215 and 216, whereby to generate an actuating output signal and effect the proper control. If the logical circuit connections are arranged in the form of a matrix to permit the use of a read-only memory (ROM), any modification in the control conditions of the exhaust emission control systems may be readily dealt with.

Figure 9A:
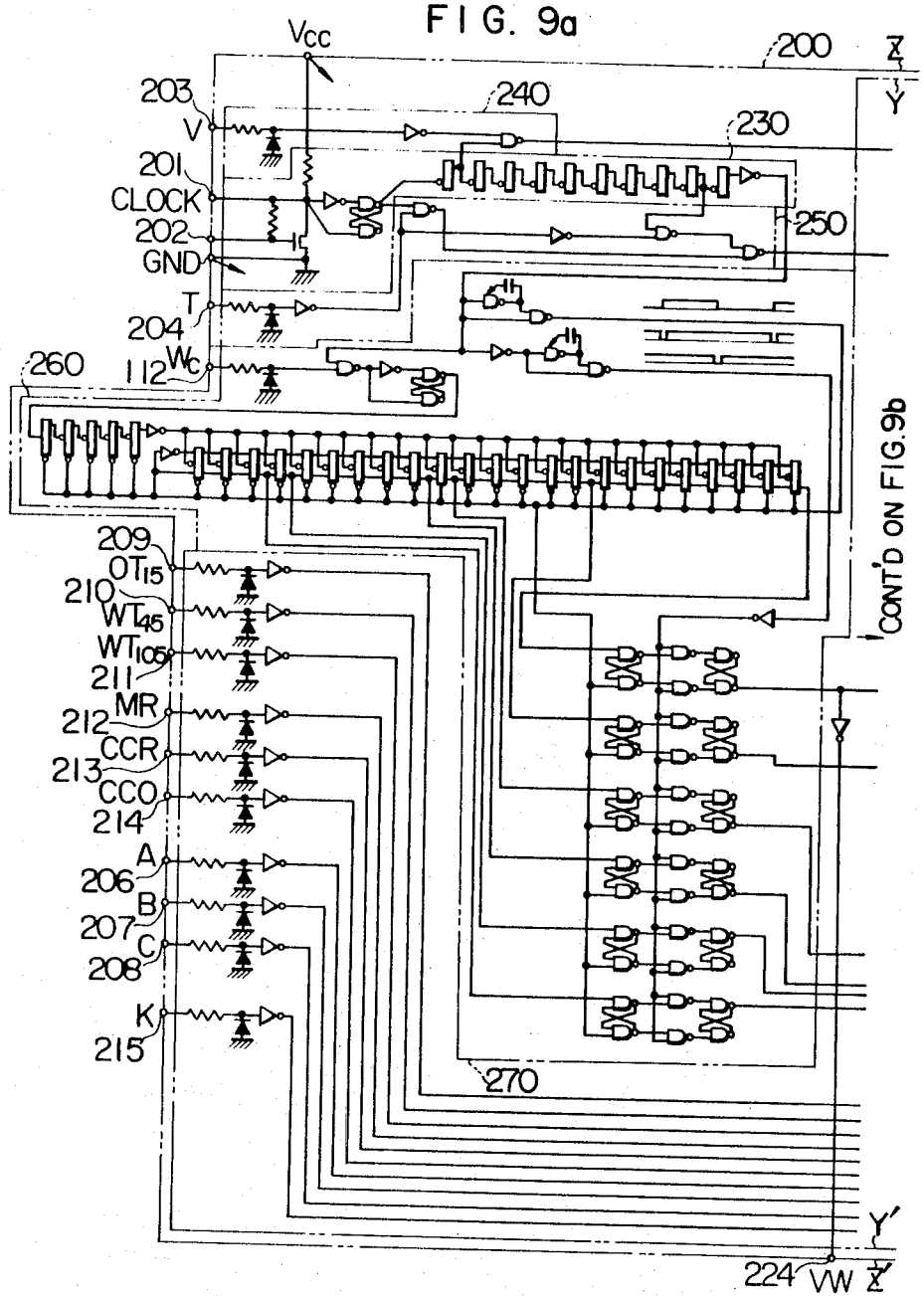
FIGS. 9a and 9b are detailed circuit diagrams for the block diagram shown in FIG. 5.
Figure 9B:
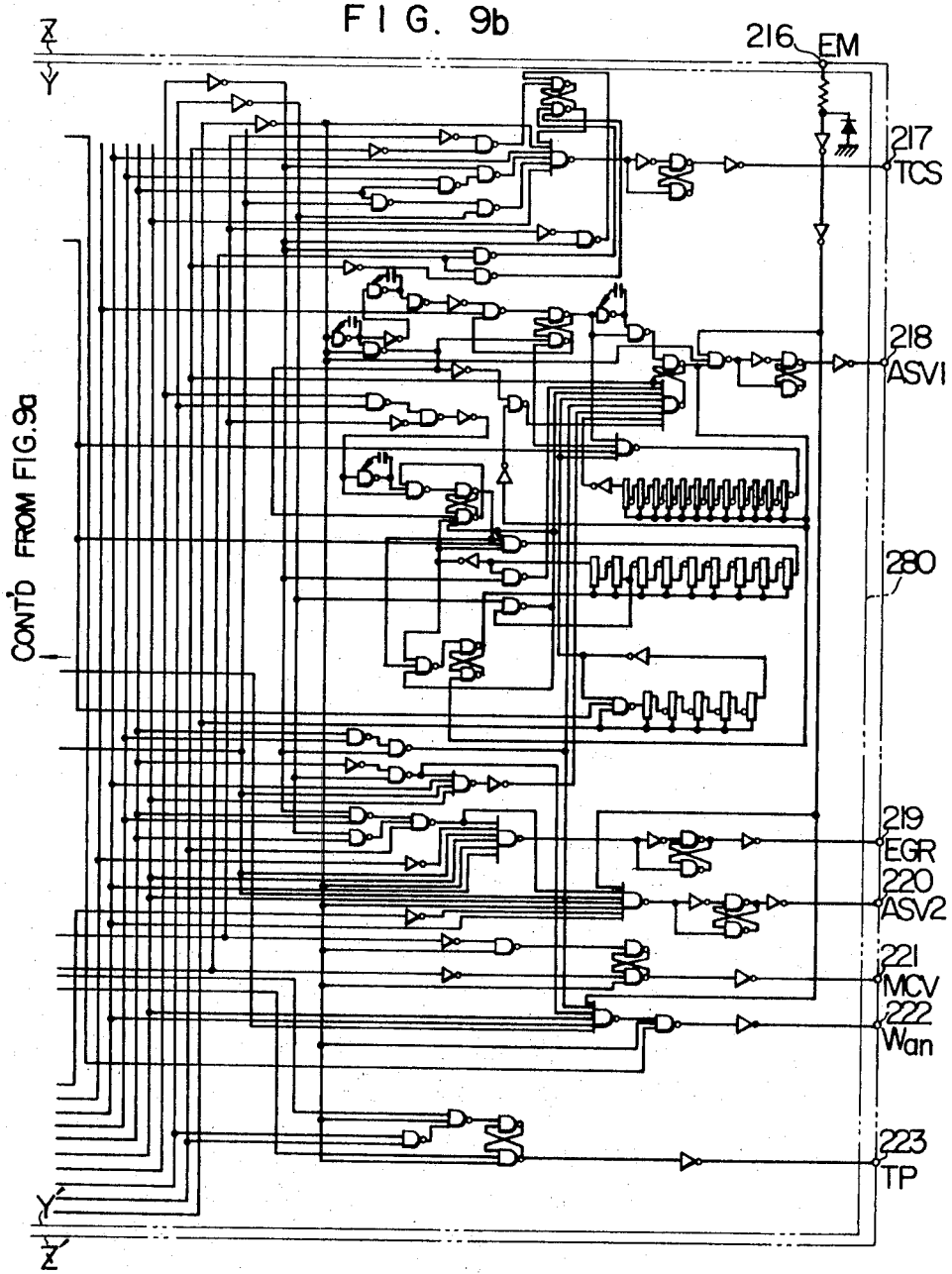

In FIG. 9 there is illustrated by way of example a detailed circuit diagram of the control circuit 100 comprising the above-mentioned timing signal generating circuit 230, the alarm generating circuit 240, the time interval generating circuit 250, the speed signal generating circuit 260, the vehicle speed discriminating circuit 270 and the control program circuit 280. The functional relationship between the inputs and outputs will be described with reference to FIG. 9. When a signal is applied to the A-system terminal 206 so that the controls are effected according to the system A, those controlled systems including the manifold reactor, oxidizing catalyst converter, reducing catalyst converter, exhaust gas recycling system (EGR) and ignition advance cutout system, and the manifold reactor and the oxidizing catalyst converter are controlled in accordance with the signals generated at ASV1-terminal 218 and ASV2-terminal 220 which turn on and off the secondary air. In other words, only the A-system switch 31 in the selector switch unit 30 is opened so that only the signal at the A-terminal 206 goes to the 1 level, while the B-system switch 32 and the C-system switch 33 are closed so that the signals at the B-terminal 207 and C-terminal 208 go to the 0 level. On the other hand, when the signal at EM-terminal 216 from the emergency command switch 41 is at the 1 level, the signal at T-terminal 204 from the time reduction indication switch 42 is at the 0 level and the signal at V-terminal 203 from the alarm selection switch 43 is at the 1 level, the solenoid valves 50 are operated as follows. When the vehicle speed is below 42 mile/h and the key switch signal is appearing at K-terminal 215, a signal is generated at TCS-terminal 217 and the ignition advance cutout solenoid coil is energized to actuate the ignition timing advance cutout system, whereas when the vehicle speed becomes higher than 42 mile/h, the ignition advance cutout solenoid coil is deenergized to release the ignition advance cut. Thereafter, when the vehicle speed becomes lower than 38 mile/h, the ignition advance cutout solenoid coil is again energized.

On the other hand, when the water temperature is higher than 45°C, the vehicle speed is below 62 mile/h, the internal temperature of the manifold reactor is below 1,050°C, the internal temperatures of the oxidizing and reducing catalyst converters are both below 750°C and the key switch signal is appearing at the K-terminal 215, a signal is generated at EGR-terminal 219 and an EGR solenoid coil is energized to cause a portion of the exhaust gases to flow back into the carburetor. When at least one of these conditions does not exist, the EGR solenoid coil is deenergized and the EGR system is cut out of operation.

Further, when the engine is cold, a signal is generated at the ASV1-terminal 218 and a first secondary air solenoid coil for controlling the supply of secondary air into the manifold reactor is energized to supply the secondary air into the manifold reactor. The conditions for this control include that the cooling water temperature is below 45°C, the internal temperature of the manifold reactor is below 1,050°C, the internal temperatures of the oxidizing and reducing catalysts are below 750°C, the vehicle speed is below 42 mile/h and the key switch signal is appearing at the K-terminal 215, and the control action takes place when all of these conditions are satisfied. On the other hand, the output signal at the ASV1-terminal 218 disappears to stop the supply of the secondary air when there occurs any of the conditions including the expiration of 505 seconds after the initiation of the control action, the expiration of 64 seconds after the vehicle speed reached 42 mile/h, the internal temperature of the manifold reactor is higher than 1,050°C, the internal temperature of either the oxidizing catalyst converter or the reducing catalyst converter is higher than 750°C, the cooling water temperature is higher than 105°C, and the vehicle speed is higher than 62 mile/h. On the other hand, in special cases where the secondary air is supplied without the presence of the above-mentioned conditions, i.e. when the first secondary air solenoid coil is energized, if the key switch signal from the K-terminal 215 terminates and then it again appears in less than 4 seconds, the control action takes place on the condition that it is continued up to the expiration of the initial period of 505 seconds or the expiration of 64 seconds after the vehicle speed reaches 42 mile/h. Further, if more than 4 seconds elapse after the termination of the key switch signal, the first secondary air solenoid coil is energized again when the above-mentioned conditions, i.e., the reapplication of the key switch signal, the dropping of the cooling water temperature below 45°C and so on are satisfied.

A second secondary air solenoid coil for controlling the supply of secondary air to the oxidizing catalyst converter operates as follows. When the internal temperature of the manifold reactor is below 1,050°C, the internal temperatures of the oxidizing and reducing catalyst converters are both below 750°C, the oil temperature is higher than 15°C, the vehicle speed is below 62 mile/h, the cooling water temperature is below 105°C and the key switch signal is appearing at the K-terminal 215, a signal is generated at the ASV2-terminal 220 and the second secondary air solenoid coil is energized to supply the secondary air to the oxidizing catalyst converter. When at least one of these conditions is not satisfied, the second secondary air solenoid coil is deenergized to stop the supply of the secondary air.

A warning indicating the deteriorated function of the control system is given in the following manner. When the internal temperature of the manifold reactor is higher than 1,050°C, the internal temperature of the oxidizing or reducing catalyst converter is higher than 750°C, the vehicle speed is higher than 97 mile/h or the cooling water temperature is higher than 105°C, that is, when any one of these conditions exists, a signal is generated at Wan-terminal 222 and this signal actuated the alarm to light the warning lamps.

A mixture control solenoid coil for supplying secondary air to the carburetor during the deceleration periods to control the emission of the exhaust hydrocarbons is operated as follows. When the vehicle speed is below 42 mile/h and the key switch signal is appearing at the K-terminal 215, a signal is generated at MCV-terminal 221 and the mixture control solenoid coil is energized to supply the secondary air to the carburetor. When the vehicle speed exceeds 42 mile/h, the mixture control solenoid coil is deenergized and it will be energized again when the vehicle speed drops below 38 mile/h.

On the other hand, a signal is generated at VW-terminal 224 to give a warning when the vehicle speed exceeds 97 mile/h.

While the signal is generated at each of the output terminals 217, 218, 219, 220, 221, 222, 223 and 224 under the above-mentioned corresponding conditions to actuated the associated controlled system, when the emergency signal applied to EM-terminal 216 goes to the 0 level to give an emergency command, the warning lamps are operated and at the same time the signals at the ASV1-terminal 218 and ASV2-terminal 220 terminate altogether with the result that the corresponding solenoid coils are deenergized and thus the supply of the secondary air is stopped to stop the reaction in the manifold reactor and the oxidizing and reducing catalyst converters where the temperature rises to a high value, thereby reducing the temperature in these systems to ensure their safety.

When it is desired to check or inspect these systems, the signal at the T-terminal 204 from the time reduction indication switch 42 is changed to the 1 level, whereby the application of the key switch signal to the K-terminal 215 under the conditions that the cooling water temperature is below 45°C, the internal temperature of the manifold reactor is below 1,050°C, the internal temperatures of the oxidizing and reducing catalyst converters are both below 750°C and the vehicle speed is below 42 mile/h, causes the time interval of 512 seconds to be reduced down to 1/512 or a second and a signal is generated at the ASV1-terminal 218 for the duration of this one second only to energize the first secondary air solenoid coil and thus to speed up the checking for the time interval of 512 seconds. The operations of the systems B and C are practically the same with that of the system A.

Figure 10:
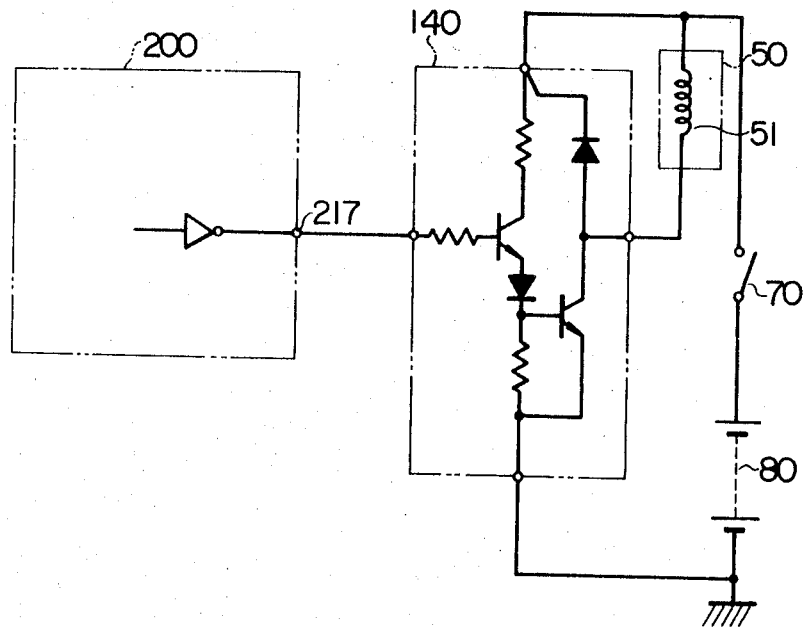
FIG. 10 is a wiring diagram showing the interconnection between the computing section and the power stage in the embodiment of FIG. 1.

Furthermore, the output terminals 217, 218, 219, 220, 221, 222, 223 and 224 of the computing section 200 are connected to the power stages 140 and 160 in the current supply mode as shown in the detailed circuit diagram of FIG. 10. In FIG. 10, the solenoid 50 operates when current flows into the power stage 140 from the terminal 217 of the control program circuit 280 in the computing section 200 and therefore there is no possibility of the solenoid 50 operating erroneously by a wiring fault in the connecting lines or the like. In other words, even when the terminal 217 is placed in either the open condition or the ground condition, the solenoid coil 51 of the solenoid valve 50 is not energized. FIG. 10 shows only one subcircuit of the power stage 140 and the other subcircuits of the power stages 140 and 160 are all identical in construction with the illustrated one.

When the computing section 200 was composed of a C-MOS LSI in accordance with the embodiment described hereinbefore, it was possible to operate it with the power supply voltage of 6 volts and the power consumption of several tens microampers (when the solenoids were not energized).

Further, while the exhaust emission control systems require timing signals having a wide time width of several hundred seconds thus requiring a considerable length of time for the checking of the time interval generating circuit of the electrical control circuit which provides such timing signals, this problem is overcome by the electric control system of this invention by providing its time interval generating circuit with a time reducing function.

We claim:

1. An electric control system for controlling solenoid valves for actuating exhaust emission control systems comprising:
a pluraliity of sensors for generating digital signals indicative of operating parameters for setting control conditions,
vehicle speed detecting means whereby a squarewave voltage having a frequency variable in response to the vehicle speed is generated when the vehicle speed is higher than a predetermined value and a squarewave voltage having a predetermined frequency is generated when the vehicle speed is lower than said predetermined value,
a clock circuit for generating reference timing signals,
a timing signal generating circuit connected to said clock circuit to generate predetermined timing signals,
a speed signal generating circuit comprising a shift register and connected to said vehicle speed detecting means and said timing signal generating circuit to generate an output signal which is shifted one stage each time said squarewave signal attains a predetermined number of cycles in a predetermined time,
a vehicle speed discriminating circuit connected to said speed signal generating circuit to determine whether the vehicle speed has reached a predetermined value,
a control program circuit connected to said plurality of sensors and said vehicle speed discriminating circuit to perform a logical operation on said digital signals indicative of operating parameters and the signal from said vehicle speed discriminating circuit to generate a control signal, and
means connected to said control program circuit to selectively actuate said solenoid valves.

2. An electric control system according to claim 1, wherein at least said timing signal generating circuit, the speed signal generating circuit, the vehicle speed discriminating circuit and the control program circuit are integrally built into a MOS integrated circuit.

3. An electric control system according to claim 1, wherein said clock circuit comprises a piezoelectric oscillator element.

4. An electric control system according to claim 1, wherein said control program circuit comprises an ROM.

5. An electric control system according to claim 1 further comprising an emergency command switch connected to said control program circuit, and a circuit for giving priority to the signal from said emergency command switch.

6. An electric control circuit according to claim 1, wherein said control program circuit supplies a control current to said solenoid actuating means only when said solenoid valve is actuated.

* * * * *